United States Patent [19]
Cosgrove et al.

[11] 3,715,297
[45] Feb. 6, 1973

[54] METHOD AND MEANS FOR EXTENDING LIFE OF ION SENSING ELECTRODE

[75] Inventors: Richard E. Cosgrove, Los Angeles; Irwin H. Krull; Charles A. Mask, both of Garden Grove, all of Calif.

[73] Assignee: Beckman Instruments, Inc., Fullerton, Calif.

[22] Filed: July 20, 1970

[21] Appl. No.: 56,509

[52] U.S. Cl. ............................................204/195 M
[51] Int. Cl. ...............................................G01n 27/46
[58] Field of Search....204/1 T, 195 A, 195 L, 195 M

[56] References Cited

UNITED STATES PATENTS 3,562,129   2/1971   Simon....................................204/195

Primary Examiner—T. Tung
Attorney—Thomas L. Peterson and Robert J. Steinmeyer

[57] ABSTRACT

Method and means for extending the useful life of an electrode utilized for measuring the ion concentration or activity of solutions. The electrode embodies an ion sensitive barrier containing a macrocyclic compound, mineral oil, preferably an aromatic component, and a sufficient amount of a compound lipid to render the barrier substantially solid. The life of the electrode is extended by subjecting the ion sensitive barrier, during storage or non-use of the electrode, to the vapors of an aromatic component, preferably a phenylether.

32 Claims, 1 Drawing Figure

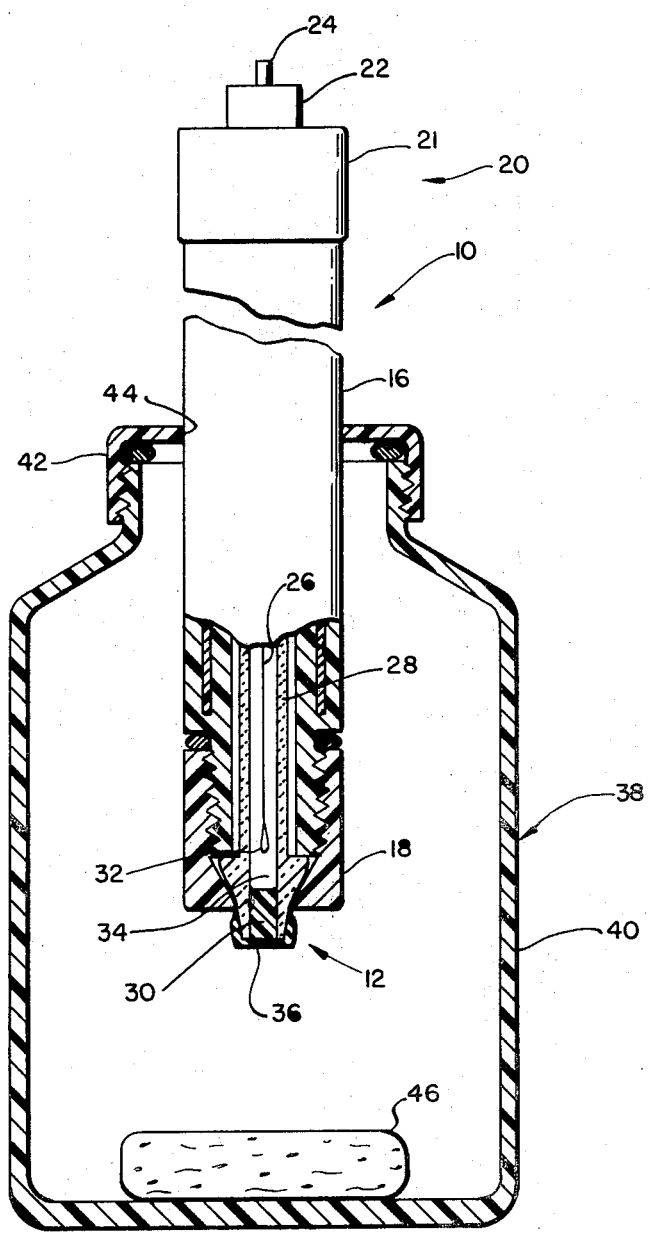

METHOD AND MEANS FOR EXTENDING LIFE OF ION SENSING ELECTRODE

CROSS-REFERENCE TO RELATED APPLICATION

The invention disclosed herein is related to and embodies some of the features of the invention disclosed in copending application of Richard Cosgrove et al. entitled "Electrochemical Electrode," Ser. No. 50,746 filed June 29, 1970.

BACKGROUND OF THE INVENTION

1. Field of the Invention

This invention relates generally to an electrochemical electrode for measuring the ion concentration or activity of a solution and, more particularly, to a method and means for extending the useful life of such an electrode.

2. Description of the Prior Art

In the foregoing Cosgrove et al. application, there are described various electrodes for measuring the potassium and ammonium ion activities of solutions. The ion sensitive barrier of each electrode contains a macrocyclic compound, mineral oil, preferably an aromatic constituent, and a sufficient amount of a compound lipid to render the barrier substantially solid. Such electrodes produce essentially a theoretical or Nernst response for a period of about two weeks, and thereafter the response of the electrodes decreases, thus limiting the useful life of the electrodes. Therefore, what is needed is some means for extending the lives of these types of electrodes.

SUMMARY OF THE INVENTION

The principal object of the present invention is to provide a method and means for extending the life of an ion measuring electrode employing an essentially solid ion sensitive barrier containing a macrocyclic compound.

According to the principal aspect of the present invention, the ion sensitive barrier of an electrode of the type described in the said Cosgrove et al. application is subjected to the vapors of an aromatic component, such as a phenylether, when the electrode is in storage or not in use. Preferably the aromatic component is located in a closed bottle having an opening in its cap receiving the sensing end of the ion measuring electrode. When it is desired to utilize the electrode to measure the ion concentration of a solution, the electrode is simply withdrawn from the bottle and immersed in the test solution. By so treating the ion sensitive barrier of the electrodes of the type disclosed in the Cosgrove et al. application, the lives of the electrodes are extended substantially.

Other objects, aspects and advantages of the invention will become apparent from the following description taken in connection with the accompanying drawing.

BRIEF DESCRIPTION OF THE DRAWING

The drawing illustrates, in partial longitudinal section, an ion measuring electrode mounted in a storage bottle containing an aromatic component in accordance with the present invention.

DESCRIPTION OF THE PREFERRED EMBODIMENTS

Referring now to the drawing in detail, there is illustrated an ion measuring electrode, generally designated 10, having a sensing end 12. The electrode, which is described in detail in the aforementioned Cosgrove application, includes a hollow tubular plastic body 16 which is closed at its sensing end 12 by means of a threaded plastic cap 18. The rear of the body 16 is closed by a cap assembly 20, which may be of the type disclosed in U.S. Pat. No. 3,476,672 to Snyder et al. Such assembly includes a metal cap 21 and a pair of concentrically mounted electrical connectors 22 and 24 which protrude from the rear of the cap. These connectors are separated by a plastic sleeve, not shown. The inner connector 24 is connected to a metal wire 26 that extends into a glass tube 28 which is retained within the body 16 by means of the cap 18. The outer connector 22 is connected to a cylindrical metal electrostatic shield, not shown, which is embedded within the wall of the body 16.

The end of the glass tube 28 is closed by an ion sensitive barrier 30. The end of the wire 26 terminates in an internal half cell 32, preferably silver-silver chloride, which is immersed in a body of electrolyte 34 contained in the lower portion of the tube 28.

Preferably a perforated membrane 36 is sealed across the lower end of the tube 28 to provide a protective covering for the ion sensitive barrier 30. The membrane may be a collodion film, polyethylene, tetrafluoroethylene, or the like.

The barrier 30 is substantially solid and immiscible with aqueous solutions. It contains a mixture of a macrocyclic compound, mineral oil and a compound lipid. Preferably the barrier also contains an aromatic component, although it is not required.

Desirable macrocyclic compounds include the monactin series, which includes nonactin, monactin, dinactin, and trinactin, valinomycin, and analogs having its ion selective character, and enniatin B. It has also been found that at least some macrocyclic polyether compounds will produce the results desired. In particular, a macrocyclic polyether synthesized by C. J. Pedersen of the Elastomer Branch of E.I. duPont deNemours and Company, Inc. has been successfully employed and it can be observed that the selected polyether [hereafter referred to as –I] operates as an ion selective medium by exhibiting the capability of forming complexes with potassium ions. The particular composition has been identified as containing eighteen ring atoms and six ring oxygens. Pedersen refers to this class of compounds as crown compounds and in his nomenclature this composition is dicyclohexyl-18-crown-6. Reference may be made to the following literature reference for further identification: "Cyclic Polyethers and Their Complex with Metal Salts," *Journal of American Chemical Society*, Volume 89, pp. 7017–7036 [1967] by C. J. Pedersen. Gramicidin, a cyclopeptide, and cyclohexyl-15-crown-5 can also be used.

Suitable mineral oils are Nujol sold by Plough, Inc. and Vaseline, which is a longer chain mineral oil, sold by Chesebrough-Pond's Inc. Examples of suitable aromatic components are nitrobenzene, phenylethers, chlorobenzene, bromobenzene and alkylated aromatics. The aromatic component may be either a solid or liquid.

The compound lipid is provided in a sufficient quantity to render the barrier substantially solid, that is, in the form of a heavy putty. Compound lipids are esters of fatty acids with alcohols and containing other groups in addition to alcohols and acids. Examples of suitable compound lipids are phosphatides or phospholipids [such as lecithin, lysolecithin, cephalin, inosital lipids and sphingomyelin], phosphatidic acids, glycolipids, and sulfolipids. These compounds are solid at room temperature and have a waxy-like texture [as opposed to a regular crystalline material]. They are insoluble in water [but may swell in its presence]. They function as a surfactant and are capable of emulsifying non-homogeneous solutions. Commercial phosphatides or phospholipids, as they are also called, are often termed "lecithin" although lecithin is actually the designation of one of the pure phosphatides. They are also sometimes called phosphatidycholine, lecithol, vitellin, kelecin and phospholutein granulestin. Because of their abundance and economy, such commercial phosphatides [which will be designated as "lecithin" hereinafter] are the preferred compound lipids for use in the barrier 30. Although only lecithin will be referred to hereinafter in this description, it will be understood that other compound lipids mentioned above as well as any other materials having the aforementioned properties may be utilized in forming the barrier 30.

For an ion sensitive barrier which is selectively sensitive to potassium ions, valinomycin is the preferred macrocyclic compound and a phenylether is the preferred aromatic component, while Nujol is the preferred mineral oil. The macrocyclic compound must be provided in sufficient quantity to render the barrier selectively sensitive to the ion being determined. By way of example, the ratio by weight of the mineral oil, aromatic component, lecithin and valinomycin in a potassium ion sensitive electrode may be approximately 1:1:6:0.04. In other words, the barrier contains about three times as much by weight of lecithin than the other constituents. Satisfactory barriers have also been made, however, containing only about twice as much lecithin than the other constituents mentioned above. In addition, successful barriers have been produced wherein the aromatic component was entirely replaced by mineral oil so that the ratio of mineral oil, lecithin, and valinomycin was about 2:6:0.04. However, such barrier exhibited slightly less time stability than the barrier containing the aromatic component.

For an electrode which is selectively sensitive to ammonium ions in the presence of other cations, the ion sensitive barrier 30 contains nonactin as the macrocyclic compound, together with the other three constituents mentioned above. Preferably, for an ammonium ion sensitive barrier, the mineral oil is Nujol and the aromatic component is either 2-phenyloxybiphenyl or bromodiphenylether. The preferred ratio by weight of the Nujol, aromatic component, lecithin and nonactin is about 1:1:6:0.1.

If a collodion membrane 36 is employed, as the first step to construct the electrode 10 the forward end of the glass tube 28 is immersed in a solution of collodion, such as Collodion-Flexible sold by Merck. This material comprises cellulose nitrate dissolved in a mixture of ether, ethanol, castor oil and camphor. Upon withdrawing the tube from the solution, a thin firm membrane will cure and become sealed to the end of the tube, thus providing the protective cover 36. Openings are provided in the membrane 36 adjacent to the barrier material 30 to permit free ion passage from the sample solution to the barrier. Three openings each having a diameter of about 0.010 inch are adequate. Such openings may be made by forcing a wire of the aforementioned dimension through the membrane 36. The barrier 30 is provided in the tube 28 by first dissolving the mixture of aromatic component, mineral oil, macrocyclic compound and lecithin in a suitable highly volatile solvent, such as chloroform, to form a solution. By the use of a syringe inserted through the rear end [not shown] of the tube 28, this solution is delivered to the forward end of the tube. The solution in the tube is allowed to cure at room temperature, whereupon the chloroform will evaporate thus leaving the solid barrier 30. Thereafter, the electrolyte 34 is delivered by a syringe to the interior of the tube 28 through the rear end of the tube. The tube 28 is then mounted in the hollow body 16 of the electrode with the internal half cell 28 received through the rear end of the tube 28. The assembly is then fixedly retained within the body 16 by means of the cap 18.

It is to be understood that the aforementioned electrode 10 is merely an example of a suitable electrode assembly which may employ the ion sensitive barrier material 30. Obviously other forms of electrodes could be utilized. For example, the electrode could comprise simply a hollow body closed by a cap having openings extending through the forward end thereof which are filled with the barrier material 30. In such an assembly, the interior of the electrode body would be filled with the electrolyte in which the internal half cell is immersed.

As stated previously, electrodes of the aforementioned type produce essentially Nernst or theoretical response in both single and mixed ion solutions for a period of about 2 weeks. Thereafter, the output of the electrodes diminishes, thus limiting the useful lives of the electrodes. In accordance with the present invention, we have discovered that by subjecting the ion sensitive barrier 30 of the electrode 10, when the electrode is in storage or not in use, to the vapors of an aromatic component, the useful life of the electrode is greatly extended. Preferably, the barrier 30 is so treated when the electrode is not in use by mounting the sensing end 12 of the electrode within a closed container 38 containing the aromatic component. The container comprises an open bottle 40 closed by a threaded cap 42. The cap has a central opening 44 slidably receiving the electrode 10 in sealing relationship. The container 38 is preferably formed of a plastic material such as polyethylene, it being understood, of course, that the container may be formed of other materials which are not attacked by the aromatic component. The aromatic component is preferably immobilized within the container 38 remote from the sensing end 12 of the electrode. For this purpose, a sponge 46 is glued to the bottom of the container 38 and the aromatic component is impregnated in the sponge. If the aromatic component is a liquid, a few drops may be delivered to the sponge 46 by a syringe or the like. If the aromatic component is a solid at room temperature it may be either heated or dissolved in a suitable solvent, such as benzene, and delivered in liquid form to the sponge. While we do not wish to be bound to any theory, it is believed that the life of the ion sensitive barrier 30 of the electrode 10 of the present invention is extended by the use of the aromatic component in the container 38 because the vapors of such aromatic component minimize the loss through evaporation or otherwise of the more volatile components, including the aromatic constituent, in the barrier 30.

The advantages of the present invention will be appreciated from the following examples:

EXAMPLE 1

A potassium ion measuring electrode as described herein and shown in the drawing employing an ion sensitive barrier comprising a mixture of about equal parts by weight of Nujol mineral oil and diphenylether, lecithin in a weight ratio to the combined weights of the mineral oil and diphenylether of approximately 3:1, and 1 percent by weight of valinomycin. The lecithin which was used is sold under the trade name "W.H.O. Brand Lecithin," by Western Health Organization, located in Los Angeles, Calif. This lecithin is derived from soy beans. The electrode was connected together with a standard calomel reference electrode to a conventional pH meter. The sensing electrode was tested in test solutions ranging from $10^{-1}$ M to $10^{-4}$ M potassium ion with a background of 0.2 M sodium ion. The output of the electrode was approximately Nernst upon initial testing. After the electrode stood in room atmosphere for approximately 4 days, its output decreased approximately 5 millivolts. After the electrode stood in room atmosphere for 3 additional days, its output dropped approximately another 20 millivolts. Thus, the useful life of the electrode diminished rapidly after approximately 7 days of the electrode being exposed to room atmosphere.

EXAMPLE 2

A potassium ion measuring electrode identical to that described in Example 1 was made except that the electrode contained 5 percent by weight valinomycin. The electrode was tested periodically throughout a 105 day period in the same test solutions described in Example 1. Between tests the electrode was exposed to an atmosphere of diphenylether in accordance with the present invention. Even after the end of such period, the electrode did not show any appreciable loss in output when tested in the mixed ion solutions of potassium and sodium.

EXAMPLE 3

Two potassium ion measuring electrodes were constructed as described hereinbefore. The barrier of one of the electrodes contained 2 mg. valinomycin, 0.05 g. Nujol, 0.05 g. phenyloxylbiphenyl and 0.3 g. lecithin while the barrier of the other electrode contained 2 mg. valinomycin, 0.05 g. Nujol, 0.05 g. bromodiphenylether and 0.3 g. lecithin. The electrodes were initially soaked for 2 hours and then tested in a variety of mixed potassium and sodium ion solutions. The output of the electrodes was essentially Nernst. The electrodes were then left standing in room atmosphere for a period of 15 days and again tested. The output of the electrodes after the 15 day exposure to room atmosphere reduced to about one half of Nernst response.

EXAMPLE 4

Electrodes identical to those described in Example 3 above were initially tested, thereafter exposed to an atmosphere of diphenylether for a period of 15 days and then retested in the test solutions. The output of the electrodes decreased only about 2 or 3 millivolts, thus showing that for a period of at least 15 days the exposure of the barriers of these electrodes to an aromatic component substantially increased the useful lives of the electrodes.

EXAMPLE 5

Two potassium ion measuring electrodes as described herein were constructed each employing an ion sensitive barrier containing 2 mg. valinomycin, 0.1 g. Nujol, and 0.3 g. lecithin. The electrode contained no aromatic component as in the electrodes described in the foregoing examples. The electrodes initially showed almost Nernst response when tested in a variety of test solutions containing mixtures of sodium and potassium ions. One electrode was left standing in room atmosphere while the other electrode was exposed to diphenylether atmosphere. After a period of 72 hours, the first electrode showed a reduction in output to almost one fourth the electrode response, while the second electrode which was exposed to the aromatic component produced almost Nernst response when tested in the test solutions. While the tests on such electrodes were conducted over only a short period of time, the advantage of subjecting the ion sensitive barrier to the vapors of an aromatic component is significantly demonstrated by the tests.

EXAMPLE 6

Three ammonium ion measuring electrodes as described herein were constructed each employing an ion sensitive barrier containing 5 mg. nonactin, 0.05 g. Nujol, 0.05 g. bromodiphenylether and 0.3 g. lecithin. One electrode was soaked in an aqueous solution while the two other electrodes were exposed to atmospheres of bromodiphenylether and diphenylether, respectively, for a period of approximately 23 days. The electrodes were then tested in a variety of test solutions containing mixtures of sodium and ammonium ions. The output of the latter two electrodes was approximately four times greater than that of the electrode which was not exposed to the vapors of the aromatic component. The latter electrodes were again permitted to stand in the atmosphere of the aromatic components and tested again approximately 1 month later. The output of the electrodes was essentially unchanged.

The test which we conducted on the above electrodes and other similar electrodes indicated that the lives of the electrodes were extended most greatly by exposing the electrodes to an atmosphere of diphenylether, while electrodes exposed to an atmosphere of bromodiphenylether did not have so long a life, but the lives of such electrodes were approximately four times greater than that of electrodes which remained standing in room atmosphere between tests. The vapor pressure of diphenylether at room temperature is about 0.1 mm Hg. Therefore, for electrodes of the type we tested the aromatic component employed in the container 38 of the present invention should have a vapor pressure close to such value. We have exposed a potassium ion measuring electrode of the type described in Example 3 above to an atmosphere of ortho-xylene and found that the ion sensitive barrier of the electrode became quite soft, if not liquid, thereby greatly shortening the life of the electrode. Thus, aromatic components having vapor pressures on the order of that of ortho-xylene, approximately 10 mm Hg, are not practical for at least some of the electrodes of the type described herein.

While several embodiments of the invention have been disclosed herein for purposes of illustration, it will be understood that various changes, alterations and modifications may be made thereto without departing from the spirit and scope of the invention as defined by the appended claims.

What is claimed is:

1. In combination, an electrode for measuring the ion activity of a solution having an ion sensitive barrier at one end thereof, said barrier containing a macrocyclic compound, mineral oil, an aromatic constituent, and a sufficient amount of compound lipid to render the barrier substantially solid, a container enclosing said one end of said electrode and engaging said electrode in sealing relationship, and an aromatic component in said container capable of maintaining the level of the voltage output of the electrode, said aromatic component having a vapor pressure at room temperature substantially less than 10 mm of Hg.

2. The combination of claim 1 wherein said container comprises a bottle having a cap threadedly engaged thereto, said cap being formed with an opening extending therethrough, and said electrode extending through said opening with said one end positioned within said bottle.

3. The combination of claim 1 including means fixedly mounted in said container for holding said aromatic component.

4. The combination of claim 1 including a porous member fixed to the wall of said container, said aromatic component being impregnated in said member.

5. The combination of claim 4 wherein said porous member is a sponge.

6. The combination of claim 1 wherein said aromatic component is a phenylether.

7. The combination of claim 6 wherein said component is selected from the group consisting of diphenylether and bromodiphenylether.

8. The combination of claim 6 wherein said component is diphenylether.

9. The combination of claim 1 wherein said macrocyclic compound is selected form the group consisting of the monactin series, valinomycin, enniatin B, dicyclohexyl-18-crown 6, cyclohexyl-15-crown-5, and gramicidin, and said lipid is a phosphatide.

10. The combination of claim 1 wherein said lipid is lecithin.

11. The combination of claim 10 wherein said macrocyclic compound is selected from the group consisting of nonactin and valinomycin.

12. The method of treating an ion measuring electrode so as to extend its useful life, said electrode having an ion sensitive barrier containing a macrocyclic compound, mineral oil, an aromatic constituent and a sufficient amount of compound lipid to render the barrier substantially solid, comprising subjecting said barrier to the vapors but not the liquid of an aromatic component from a source other than said aromatic constituent, said aromatic component having a vapor pressure at room temperature substantially less than 10 mm of Hg and being capable of maintaining the level of the voltage output of the electrode.

13. A method as set forth in claim 12 wherein said component is a phenylether.

14. A method as set forth in claim 12 wherein said component is selected from the group consisting of diphenylether and bromodiphenylether.

15. A method as set forth in claim 12 wherein said component is diphenylether.

16. A method as set forth in claim 12 wherein said barrier is subjected to said vapors by mounting a container holding said component onto said electrode in sealing relationship therewith with said barrier disposed within said container.

17. In combination, an electrode for measuring the ion activity of a solution having an ion sensitive barrier at one end thereof, said barrier containing a macrocyclic compound, mineral oil, and a sufficient amount of compound lipid to render the barrier substantially solid, a container enclosing said one end of said electrode and engaging said electrode in sealing relationship, and an aromatic component in said container capable of maintaining the level of the voltage output of the electrode, said aromatic component having a vapor pressure at room temperature substantially less than 10 mm of Hg.

18. The combination of claim 17 wherein said container comprises a bottle having a cap threadedly engaged thereto, said cap being formed with an opening extending therethrough, and said electrode extending through said opening with said one end positioned within said bottle.

19. The combination of claim 17 including means fixedly mounted in said container for holding said aromatic component.

20. The combination of claim 17 including a porous member fixed to the wall of said container, said aromatic component being impregnated in said member.

21. The combination of claim 20 wherein said porous member is a sponge.

22. The combination of claim 17 wherein said aromatic component is a phenylether.

23. The combination of claim 22 wherein said component is selected from the group consisting of diphenylether and bromodiphenylether.

24. The combination of claim 22 wherein said component is diphenylether.

25. The combination of claim 17 wherein said macrocyclic compound is selected from the group consisting of the monactin series, valinomycin, enniatin B, dicyclohexyl-18-crown 6, cyclohexyl-15-crown-5, and gramicidin, and said lipid is a phosphatide.

26. The combination of claim 17 wherein said lipid is lecithin.

27. The combination of claim 26 wherein said macrocyclic compound is selected from the group consisting of nonactin and valinomycin.

28. The method of treating an ion measuring electrode so as to extend its useful life, said electrode having an ion sensitive barrier containing a macrocyclic compound, mineral oil, and a sufficient amount of compound lipid to render the barrier substantially solid, comprising subjecting said barrier to the vapors but not to the liquid of an aromatic component having a vapor pressure at room temperature substantially less than 10 mm of Hg and being capable of maintaining the level of the voltage output of the electrode.

29. A method as set forth in claim 28 wherein said component is a phenylether.

30. A method as set forth in claim 28 wherein said component is selected from the group consisting of diphenylether and bromodiphenylether.

31. A method as set forth in claim 28 wherein said component is diphenylether.

32. A method as set forth in claim 28 wherein said barrier is subjected to said vapors by mounting a container holding said component onto said electrode in sealing relationship therewith with said barrier disposed within said container.

* * * * *